(12) United States Patent
Neshumov

(10) Patent No.: US 11,108,998 B2
(45) Date of Patent: Aug. 31, 2021

(54) METHOD AND SYSTEM FOR PROVIDING VIDEO INTERCOM TRANSMISSION OF IMAGES

(71) Applicant: Armen G. Neshumov, Moscow (RU)

(72) Inventor: Armen G. Neshumov, Moscow (RU)

( * ) Notice: Subject to any disclaimer, the term of this patent is extended or adjusted under 35 U.S.C. 154(b) by 0 days.

(21) Appl. No.: 17/082,010

(22) Filed: Oct. 28, 2020

(65) Prior Publication Data

US 2021/0044781 A1   Feb. 11, 2021

(30) Foreign Application Priority Data

Apr. 28, 2018 (RU) ............................ RU2018116218

(51) Int. Cl.
*H04N 7/18* (2006.01)
*H04W 84/12* (2009.01)

(52) U.S. Cl.
CPC ............. *H04N 7/186* (2013.01); *H04N 7/181* (2013.01); *H04W 84/12* (2013.01)

(58) Field of Classification Search
CPC .......... H04N 7/186; H04N 7/181; H04N 7/18; H04W 84/12; H04M 11/02
See application file for complete search history.

(56) References Cited

U.S. PATENT DOCUMENTS

| | | | | |
|---|---|---|---|---|
| 4,554,411 A | * | 11/1985 | Armstrong ............ | H04M 9/001 340/384.72 |
| 2015/0035987 A1 | * | 2/2015 | Fernandez ............ | H04N 7/186 348/156 |
| 2016/0014381 A1 | * | 1/2016 | Rolf ....................... | H04N 5/272 348/14.07 |

FOREIGN PATENT DOCUMENTS

| | | |
|---|---|---|
| CN | 202587210 U | 12/2012 |
| CN | 203912093 U | 10/2014 |
| CN | 105357596 A | 2/2016 |
| JP | 2014229914 A | 12/2014 |
| RU | 2257682 C2 | 7/2005 |
| RU | 2379851 C1 | 1/2010 |
| RU | 2011143983 A | 5/2013 |

OTHER PUBLICATIONS

International Search Report PCT/RU2019/000288, filed Apr. 23, 2019, dated Sep. 5, 2019.

* cited by examiner

*Primary Examiner* — Jared Walker
(74) *Attorney, Agent, or Firm* — Patentbar International, P.C.

(57) ABSTRACT

A method and a system for providing IP video intercom transmission from surveillance cameras make it possible to transmit video stream from IP cameras to a user's IP video monitor installed in a user's apartment. The user's IP video monitor is designed to receive an electrical signal from a standard intercom system installed directly in the called user's apartment. An electrical signal from the standard intercom system is a signal only for activating video stream from an IP camera when there is an electrical signal of a certain polarity and magnitude from at least one call button of the standard intercom system installed outside the called user's apartment for communication with said user. A video stream from the IP camera is transmitted to the user's IP video monitor using a Wi-Fi network installed in the user's apartment.

15 Claims, 2 Drawing Sheets

METHOD AND SYSTEM FOR PROVIDING VIDEO INTERCOM TRANSMISSION OF IMAGES

RELATED APPLICATIONS

This application is a Continuation application of International Application PCT/RU2019/000288, filed on Apr. 23, 2019, which in turn claims priority to Russian Patent Applications RU 2018116218, filed Apr. 28, 2018, both of which are incorporated herein by reference in their entirety.

FIELD OF THE INVENTION

The present invention relates in general to the field of public utilities and more particularly pertains to a multi-tenant intercom system using Internet technologies.

BACKGROUND OF THE INVENTION

Video intercom systems are known in the prior art (e.g. see Patent No. RU 2379851 C1, published on Jan. 20, 2010).

The known system comprises an electric lock mounted on a door and connected to a multi-tenant video intercom with a built-in video camera; switchboards; a data storage server connected to the building's local network with dispatcher computer hardware; and display devices installed in an apartment. The video intercom is connected to an IP video gateway which is connected to the building's local network, where the video intercom has a digital port connected via an Ethernet adapter to a TCP/IP network which is connected to a data storage server with dispatcher computer hardware and IP video phones installed in apartments, and the system contains an IP PBX.

Such system does not use the analog line of a standard intercom system and, therefore, does not disclose a principle for using it as a basis for building a functional IP video intercom system.

SUMMARY OF THE INVENTION

The purpose of the present invention is to create a reliable (i.e. capable of performing required functions in specified modes and conditions) and accurate means of providing IP video intercom connection based on an existing standard intercom system which originally does not feature video image transmission from a door station and displaying such image on a user device.

The technical result of the invention is to provide stable and reliable (i.e. capable of performing required functions in specified modes and conditions) IP video intercom transmission of video image from surveillance cameras based on a standard intercom system which does not feature video image transmission from a door station and displaying such image on a user device.

The described technical result is achieved by the method for providing IP video intercom transmission of video image from surveillance cameras based on a standard intercom system which does not feature video image transmission, such method consisting in that at least one IP camera, designed to transmit video stream to the user's IP video monitor installed in the user's apartment, is installed outside the building's entrance door and/or in the lobby and/or outside the user's entrance door, where the user's apartment is equipped with standard intercom system equipment which does not feature video image transmission, where said standard intercom system equipment comprises control elements for opening the door, control elements for conducting audio communication with a visitor and a channel for receiving an analog electrical signal on calling the apartment's user from at least one electrical signal actuator, where said channel for receiving an analog electrical signal on calling the apartment's user is connected to the user's IP video monitor designed to process said analog electrical signal so that it is a signal only for activating video displaying on the user's IP video monitor from at least one IP camera, moreover, the user's IP video monitor is designed to be connected to an analog electrical line of electrical signal actuators not incorporated in said standard intercom system, where an analog electrical calling signal from at least one electrical signal actuator not incorporated in said standard intercom system is also a signal only for activating video displaying on the user's IP video monitor from at least one IP camera, where video stream displaying from at least one IP camera on the user's IP video monitor is conducted via a Wi-Fi network installed in the user's apartment and/or via data communication networks available to the user, including femtocells available to the user, where at least one IP camera (if it is not equipped with a built-in radio modem for Internet connection) is connected to a router, which is set up in such a way that said router and/or at least one IP camera are accessible from the Internet, moreover, when video transmission is activated on the user's IP video monitor, the user may control the video intercom transmission process on their IP video monitor. Here, when the user IP video monitor is connected to the standard intercom system channel, the equipment installed in the tenant's apartment is dismantled, and the functions of door opening and audio communication are performed by the IP video monitor.

During a call, the IP video monitor displays a full-screen image from the IP camera which is specified in the IP video monitor software as the main camera in the list of cameras connected to the IP video monitor, or from several IP cameras at the same time by dividing the IP video monitor display into several sections for viewing video stream from several IP cameras, where the user may switch from the divided screen mode into the full-screen mode by double-clicking on any of the reduced-size images.

The IP video monitor is designed to activate the command for opening the building's entrance door and to provide audio communication using the IP video monitor's built-in control elements, speaker and microphone.

The electrical signal actuators are button, lever, limit, magnetic or touch-sensitive switches, as well as motion, sound, light, temperature, pressure, humidity, smoke, leakage, and gas sensors.

The user control of the video intercom transmission process on the IP video monitor includes at least the option to end the video session by using a control element provided on the IP video monitor.

A system for providing IP video intercom transmission of video image from surveillance cameras, based on a standard intercom system, which does not feature video image transmission, is characterized in that the user component is an IP video monitor which comprises the first digital microelectronic module, being an IP module designed to play video stream from at least one IP camera, and the second digital microelectronic module, being a digital microelectronic interface device between the first microelectronic module and the standard intercom system communication channel, where the communication channel is a channel for receiving an analog electrical signal on calling the apartment's user from at least one electrical signal actuator, where said communication channel is connected directly to the apartment of a standard intercom system user, where the second digital microelectronic module is also designed to provide an interface between the first microelectronic module and an analog electrical line of electrical signal actuators not incorporated in said standard intercom system, where the first digital microelectronic module is also designed to play video stream from at least one IP camera when an analog electrical signal is present in the second microelectronic module, said signal occurring as a result of external input to at least one electrical signal actuator incorporated in the standard intercom system, or at least one electrical signal actuator not incorporated in the standard intercom system, where video stream from at least one IP camera is transmitted to the IP video monitor via a wireless or wire data communication channel, where at least one IP camera transmitting video stream to the IP video monitor is either equipped with a built-in radio modem and is capable of establishing Internet connection on its own, or the IP camera is connected to a router, which is set up in such a way that said router and at least one IP camera are accessible from the Internet. Here, when the user IP video monitor is connected to the standard intercom system channel, the equipment installed in the tenant's apartment is dismantled, and the functions of door opening and audio communication are performed by the IP video monitor.

The IP video monitor is designed to provide the user with the choice of at least one command for controlling the video communication process, where at least one command for controlling the video communication process includes the option to end the transmission session on the IP video monitor.

The IP video monitor is designed to activate the command for opening the building's entrance door and to provide audio communication using the IP video monitor's built-in control elements, speaker and microphone.

The user control of the video intercom transmission process on the IP video monitor includes at least the option to end the video session by using a control element provided on the IP video monitor.

The network used as a wireless communication channel is a Wi-Fi network installed in the user's apartment and/or a data communication network available to the user, including a femtocell.

The electrical signal actuators are button, or lever, or limit, or magnetic or touch-sensitive switches, and/or motion, or sound, or light, or temperature, or pressure, or humidity, or smoke, or leakage or gas sensors.

The first microelectronic module runs on an operating system which allows viewing video stream transmitted by the IP camera, where the first microelectronic module contains an LCD touchscreen display, a motherboard, a network interface card, a rechargeable battery and/or a power supply unit, a Wi-Fi module, a microphone and a speaker.

The first microelectronic module also additionally contains a SIM card slot and a front camera.

The first microelectronic module also additionally contains a Bluetooth module.

During a call, the IP video monitor displays a full-screen image from the IP camera which is specified in the IP video monitor software as the main camera in the list of cameras connected to the IP video monitor, or from several IP cameras at the same time by dividing the IP video monitor display into several sections for viewing video stream from several IP cameras.

DETAILED DESCRIPTION OF THE PREFERRED EMBODIMENTS

Figure 1:
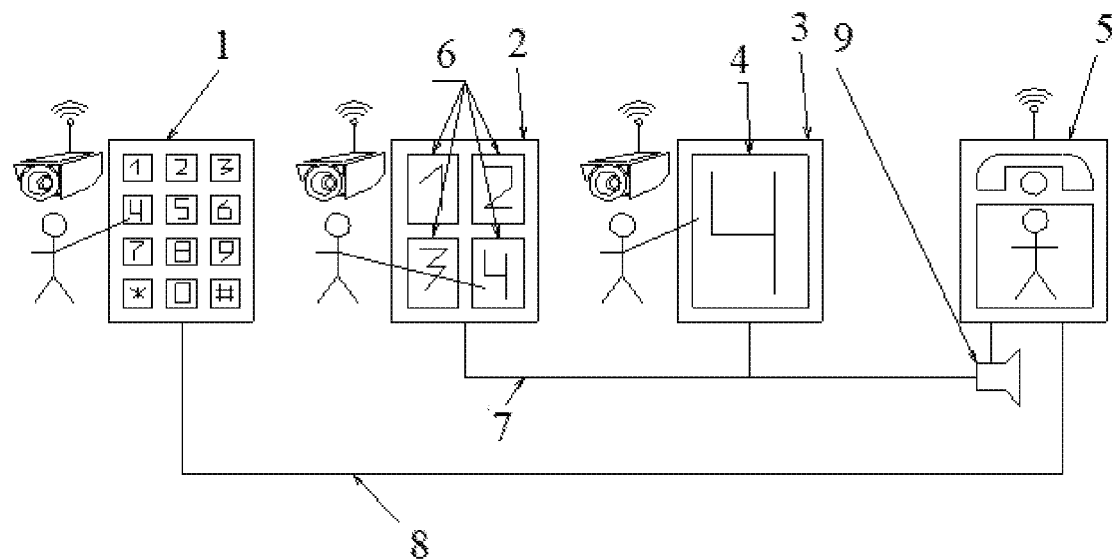
FIG. 1 shows a general diagram for the implementation of the claimed method.
Figure 2:
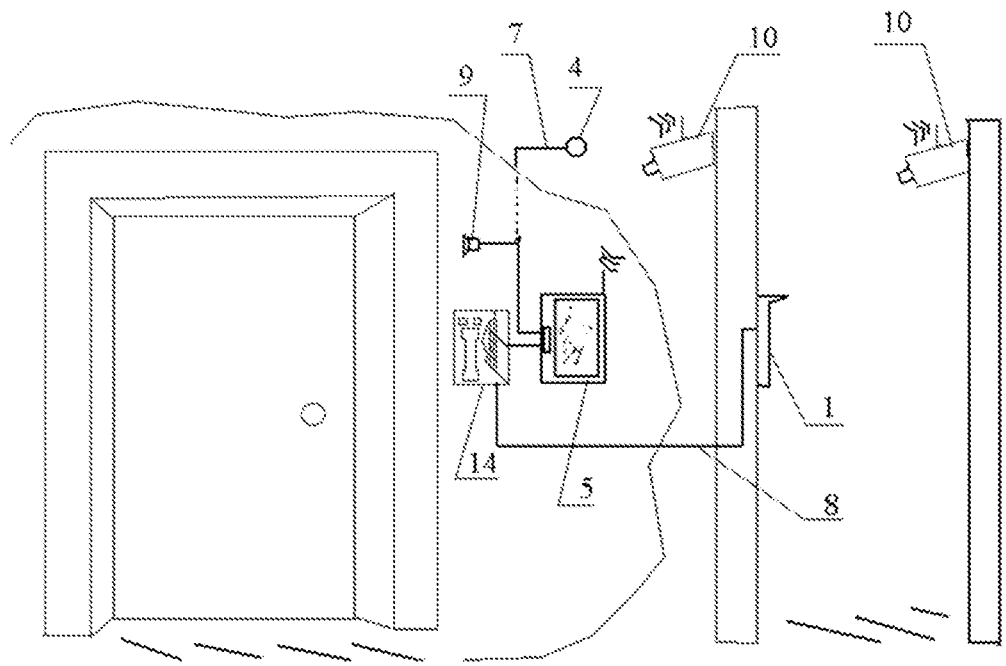
FIG. 2 shows a general layout and wiring diagram of the claimed system components until the disassembly of the standard user device.
Figure 3:
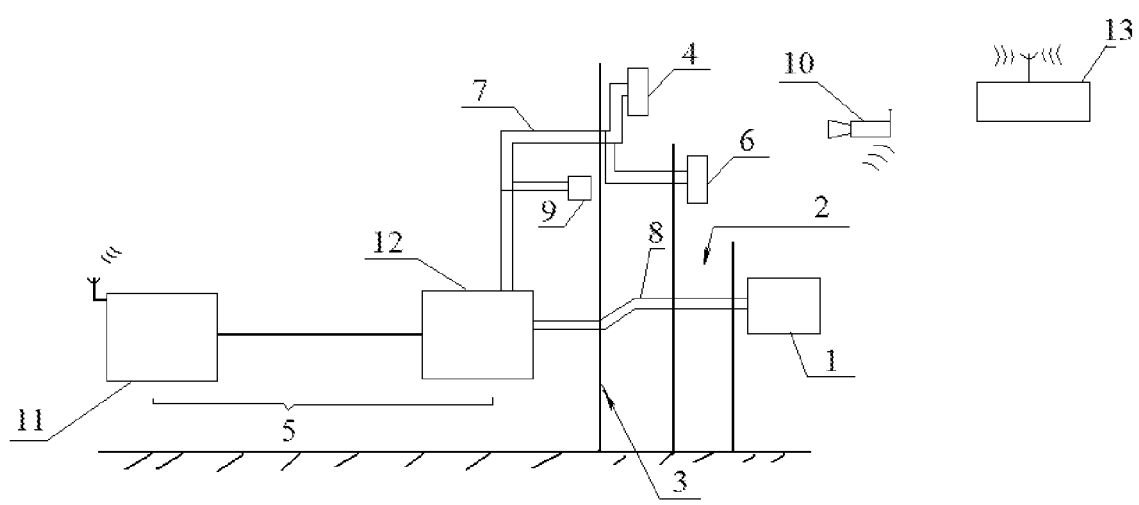
FIG. 3 shows a flow chart of the intercom system according to claimed invention.

The claimed method and system are based on using standard intercom systems which originally do not feature any devices allowing video communication between a user in an apartment and a caller. Generally, the standard intercom systems are crossbar or digital intercom systems. Digital multi-tenant intercom systems are such systems where the apartment number is set on the handset board. Crossbar multi-tenant intercom systems are such systems where the apartment number is set on the building section's switchboard.

The claimed method and system are based on equipping a standard intercom system, already installed in an apartment building or a house, with additional equipment (such equipment being an IP device, more precisely, an IP video monitor (5)) which provides video communication by transmitting video stream from IP cameras (10) installed outside the apartment, for example, in the lobby, hallway, stair hall, in front of the building's or apartment's door, and by using an analog electrical signal from a standard intercom system—a channel (8) for receiving an analog electrical signal on calling the apartment's user from at least one electrical signal actuator (1) (actuators incorporated in an intercom network), and from a standard supply line (7) which is an electric power line for connecting actuators (4, 6) of a doorbell (9), such actuators being not incorporated in the specified standard intercom system. Electrical signal actuators may include, for example, button switches. In other embodiments, electrical signal actuators may include sensor actuators (sensor switches) installed outside the apartment, for example, in the lobby, hallway, stair hall, in front of the building's or apartment's door.

Here, said analog electrical signal arises when a person intending to call a user's apartment presses the following buttons: a combination of buttons (for example, electrical signal actuators incorporated in a standard intercom system) or electrical signal actuators not incorporated in a standard intercom system:

a combination of buttons on the door station (actuators (1) incorporated in an intercom network) installed in front of the apartment building entrance;

a doorbell (6) installed on the user's floor (2) in front of the door of a lobby with entrances to multiple apartments;

a doorbell installed directly in front of the apartment door (3) of the called user.

Standard equipment of a standard intercom system installed in a user's apartment is a user device (14) comprising, for example, a handset or a speaker phone for conducting an audio communication session and control elements (for example, buttons) for controlling the process of opening the intercom door, and for controlling the audio communication session—the start and end of a calling process which a visitor initiates by pressing the calling signal actuator incorporated in a standard intercom system.

For the implementation of the claimed method, the user device (14) is disassembled, and the channel (8) for receiving an analog electrical signal on calling the apartment's user is connected to the IP video monitor (5). Here, the IP video monitor (5) is structurally and functionally designed to open the building's entrance door (the door connected to the intercom) and to provide audio communication between the apartment's user and the caller via actuators (1) incorporated in the intercom network.

The claimed method may be implemented by using a system for providing IP video intercom connection based on an existing standard intercom system, which originally does not feature video image transmission.

This system uses an IP video monitor (5) comprising two main digital microelectronic modules.

The first microelectronic module (11) (hereinafter referred to as the IP module) is a digital microelectronic network device, for example, running on an Android or Linux operating system, with installed software required for its operation, in particular, for viewing video stream transmitted by the IP camera. The first microelectronic module contains an LCD touchscreen display, a motherboard, a network interface card, a Wi-Fi module, a Bluetooth module (optional), a SIM module for transmitting data via mobile networks (optional), a microphone, a speaker, and a front camera (optional). Here, the IP module (the first microelectronic module) may be equipped with a storage battery recharged by a power supply unit from an external power source, or the IP module may be designed to be powered from an external electrical network via a power supply unit, or the IP module may be designed to be powered from the second microelectronic module (the interface module).

Here, the signal for opening the building's entrance door is transmitted via the standard intercom communication line, just like the two-way audio communication between the user's IP video monitor and the multi-apartment door station installed at the building's entrance door is conducted via the standard intercom communication line.

The second microelectronic module (12) (hereinafter referred to as the interface and control module) is a digital microelectronic interface device between the first microelectronic module and the standard intercom system which is installed in most apartment buildings. Moreover, the second microelectronic module issues certain control commands to the first microelectronic module regardless of the presence of electric current in the standard intercom network (channel) at the moment, for example, a command to "return to the standby mode" after a certain period of time.

The IP module is connected to the second microelectronic module via a communication channel which also operates as the IP module's power supply line.

In some cases, for example, if it is impossible to connect a power supply unit in the user's foyer, the user's IP video monitor is equipped with a third microelectronic module which is connected to the user's electrical network in the stair hall (directly after the electric meter) and to the standard intercom network in the stair hall, and which, in the absence of an electric current of a certain polarity and magnitude in the standard intercom network (the idle mode), switches to the operation mode by applying appropriate supply voltage to the second module, which, in turn, identifies that the voltage in the standard intercom network is different from the call mode voltage, and applies only supply voltage to the first module. When an electric current of a certain polarity and magnitude arises in the standard intercom network before the third module (the call mode), the third module switches to the pass-through mode in which it simply passes the current, and the second module identifies that the network voltage corresponds to the call mode voltage and sends a control command to the first module to launch the application for viewing video transmitted by the IP camera. Here, during a call the IP video monitor produces a call signal received via a standard intercom communication channel.

Description of the System Operation

A visitor dials an apartment number on a standard intercom door station, an analog electrical signal actuator, which is a part of a standard intercom system. The tenant hears a call signal on the user IP video monitor. Within a short period of time (from 0.1 to 5 seconds), a video image of the visitor appears on the LCD screen of the user IP video monitor. If the tenant does not wish to let the visitor inside, they do not have to do anything. The visitor will not know that the tenant does not wish to let them in and will most likely think that nobody is home. During this time, a call signal continues to ring on the user IP video monitor, and a waiting signal continues to ring on the standard intercom door station. If the tenant wishes to talk to the visitor, the tenant may press the audio button on the user IP video monitor and talk to the visitor, whereupon, if desired, the tenant may open the building's entrance door by pressing the door release button on the user IP video monitor. If the tenant recognizes the visitor on the video image, the tenant may open the building's entrance door without talking to the visitor by pressing the door release button on the user IP video monitor. As soon as the tenant presses the door release button or the call button, the call signal stops, while the video image continues to be displayed until the tenant turns it off on the IP video monitor, or until it turns off automatically by timer.

Here, during a call, the IP video monitor displays a full-screen image from the IP camera which is defined (specified in the IP video monitor software) as the main camera in the list of cameras connected to the IP video monitor, or from several IP cameras at the same time (wherein the display is divided into several sections), in which case an image from any camera may be expanded to full screen by clicking (e.g., double-clicking) on the part of the screen which displays a reduced-size image from such camera, where the full-screen mode offers an opportunity to move between images from several cameras by touching the screen and swiping an unwanted image left or right, where the image from the next camera shifts the image from the previous camera left or right. Here, the main camera is the one which is displayed in the top left section of the screen in the divided screen mode. The status of cameras and their selection may be changed using the software installed on the IP video monitor.

The IP video monitor may be standardly or optionally equipped with a hardware motion sensor (e.g., a Fresnel lens), in order to turn on the screen with displaying a static image or a background of any color when the motion sensor is triggered; in this case, the IP video monitor will light up the area around it, which may be useful, for example, in order to illuminate the room in dark conditions when a person passes the IP video monitor. After a period without any motion (which is adjustable), the display will go out. The hardware motion sensor does not function when video is transmitted on the IP video monitor.

The above-described operation of an IP video intercom system, based on a standard intercom system without an IP video transmission function, is achieved as follows.

When a visitor calls a tenant of an apartment, an electric current of a certain polarity and magnitude arises in the standard intercom network channel of such apartment. The intercom network (channel) is connected by LV cables via a multifunction jack with the user IP video monitor, more specifically with the interface and control module, and during a call, electric current in the intercom network flows through the interface and control module, to launch software for IP camera video transmission on the user IP video monitor. At this moment, the user IP video monitor starts transmitting video stream from the IP camera installed at the building's entrance, connecting to the IP camera via the home Wi-Fi network and/or any data communication networks available to the user, including any femtocells available to the user. Here, the router (13) connected to the IP camera (10) is set up in such a way that it and, respectively, at least one IP camera are accessible from an external network (the Internet), and if the IP camera is equipped with its own built-in Internet modem (e.g., 3G and/or 4G), then the IP camera is set up in such a way that it is accessible from the Internet.

The uniqueness of this technical solution is as follows:

It is not required to replace the standard door station at the building's entrance door with an expensive video door station. It is enough to install an IP camera.

It is not required to install any wires from the building's entrance to each apartment.

It is not required to connect with the standard intercom network on the section between the building's entrance door and the apartment. The connection to the standard intercom network is carried out inside the tenant's apartment. The operation of the IP video intercom does not affect the existing intercom network in any adverse way.

Nothing changes for those tenants who do not wish to install a user IP video monitor at their apartment (they continue to use the standard intercom system).

The installation time of a user IP video monitor is 15 minutes for each apartment. The installation time of an IP camera is 1 hour for each building section.

Since the user IP video monitor has Internet access, a tenant of any apartment may connect their user IP video monitor to several other IP cameras. For example, the tenants of one floor may wish to install an additional IP camera on their floor, in front of the common door. Here, the user IP video monitor installed in a particular apartment will only receive a control signal to turn on the video image if the visitor presses the doorbell of such particular apartment. In this connection scheme, the interface and control module is connected not only with the intercom network, but also with the apartment's doorbell.

If there is no 220V power outlet in the user's (tenant's) foyer, there is no need to install it, because the IP video intercom is optionally equipped with a third microelectronic module which is connected to the 220V mains and the standard intercom network outside the apartment, more specifically in the stair hall at the "floor-apartment" section, and allows to apply voltage to the IP video intercom in the idle mode of the intercom network, by using the standard intercom network cables, without affecting the standard intercom network in any adverse way.

What is claimed is:

1. A method for providing IP video intercom transmission of a video image from surveillance cameras of a standard intercom system, the standard intercom system not having a feature of video image transmission, the method comprising:
    installing at least one IP camera for transmitting a video stream to an IP video monitor of a user, the IP video monitor being installed in a user's apartment, outside of a building's entrance door and/or in a lobby and/or outside of a user's entrance door; and
    providing the user's apartment with the standard intercom system equipment not featuring video image transmission, wherein said standard intercom system equipment comprises:
    control elements for opening a door, control elements for conducting audio communication with a visitor and a channel for receiving an analog electrical signal on calling the user from at least one electrical signal actuator:
    said channel for receiving the analog electrical signal on calling the user is connected to the user's IP video monitor serving to process said analog electrical signal so that it is a signal only for activating video displaying on the IP video monitor from at least one IP camera;
    the user's IP video monitor being connected to an analog electrical line of electrical signal actuators not incorporated in said standard intercom system;
    wherein an analog electrical calling signal from at least one electrical signal actuator not incorporated in said standard intercom system is also a signal only for activating video displaying on the user's IP video monitor from at least one IP camera;
    wherein video stream displaying from at least one IP camera on the user's IP video monitor is conducted via a Wi-Fi network installed in the user's apartment and/or via data communication networks available to the user, including femtocells available to the user;
    wherein at least one IP camera is connected to a router set up in such a way that such router and/or at least one IP camera are accessible from the Internet; and
    wherein when video transmission is activated on the user's IP video monitor, the user may control the video intercom transmission process on their IP video monitor, and when the user IP video monitor is connected to the standard intercom system channel, the equipment installed in the user's apartment is dismantled, and the functions of door opening and audio communication are performed by the IP video monitor.

2. The method according to claim 1, wherein during a call, the IP video monitor displays a full-screen image from the IP camera which is specified in the IP video monitor software as the main camera in the list of cameras connected to the IP video monitor, or from several IP cameras at the same time by dividing the IP video monitor display into several sections for viewing video stream from several IP cameras, where the user may switch from the divided screen mode into the full-screen mode by double-clicking on any of the reduced-size images.

3. The method according to claim 1, wherein the IP video monitor is designed to activate the command for opening the building's entrance door and to provide audio communication using the IP video monitor's built-in control elements, speaker and microphone.

4. The method according to claim 1, wherein the electrical signal actuators are button, lever, limit, magnetic or touch-sensitive switches, as well as motion, sound, light, temperature, pressure, humidity, smoke, leakage, and gas sensors.

5. The method according to claim 1, wherein the user control of the video intercom transmission process on the IP video monitor includes at least the option to end the video session by using a control element provided on the IP video monitor.

6. A system for providing IP video intercom transmission of a video image from surveillance cameras of a standard intercom system, the standard intercom system not having a feature video image transmission, the system comprising:

a user component being an IP video monitor comprising a first digital microelectronic module being an IP module designed to play a video stream from at least one IP camera, and a second digital microelectronic module being a digital microelectronic interface device between the first microelectronic module and a standard intercom system communication channel;

the communication channel serving to receive an analog electrical signal on calling a user of an apartment from at least one electrical signal actuator incorporated in the standard intercom system, the communication channel being connected directly to the apartment of the user;

the second digital microelectronic module designed to provide an interface between the first microelectronic module and an analog electrical line of electrical signal actuators not incorporated in the standard intercom system, wherein the first digital microelectronic module is designed to play the video stream from the at least one IP camera when the analog electrical signal is present in the second microelectronic module;

said analog electrical signal occurring as a result of an external input to at least one electrical signal actuator incorporated in the standard intercom system, or at least one electrical signal actuator not incorporated in the standard intercom system;

the video stream from the at least one IP camera is transmitted to the IP video monitor via a wireless or wire data communication channel, wherein the at least one IP camera transmitting video stream to the IP video monitor is either equipped with a built-in radio modem and is capable of establishing Internet connection on its own, or the IP camera is connected to a router set up in such a way that said router and at least one IP camera are accessible from the Internet; and when the user IP video monitor is connected to the standard intercom system channel, the equipment installed in the apartment of the user is dismantled, and the functions of door opening and audio communication are performed by the IP video monitor.

7. The system according to claim 6, wherein the IP video monitor is designed to provide the user with the choice of at least one command for controlling the video communication process, where at least one command for controlling the video communication process includes the option to end the transmission session on the IP video monitor.

8. The system according to claim 6, wherein the IP video monitor is designed to activate the command for opening the building's entrance door and to provide audio communication using the IP video monitor's built-in control elements, speaker and microphone.

9. The system according to claim 6, wherein the user control of the video intercom transmission process on the IP video monitor includes at least the option to end the video session by using a control element provided on the IP video monitor.

10. The system according to claim 6, wherein the network used as a wireless communication channel is a Wi-Fi network installed in the user's apartment and/or a data communication network available to the user, including a femtocell.

11. The system according to claim 6, wherein the electrical signal actuators are button, or lever, or limit, or magnetic or touch-sensitive switches, and/or motion, or sound, or light, or temperature, or pressure, or humidity, or smoke, or leakage or gas sensors.

12. The system according to claim 6, wherein the first microelectronic module runs on an operating system which allows viewing video stream transmitted by the IP camera, where the first microelectronic module contains an LCD touchscreen display, a motherboard, a network interface card, a rechargeable battery and/or a power supply unit, a Wi-Fi module, a microphone and a speaker.

13. The system according to claim 6, wherein the first microelectronic module also additionally contains a SIM card slot and a front camera.

14. The system according to claim 6, wherein the first microelectronic module also additionally contains a Bluetooth module.

15. The system according to claim 6, wherein during a call, the IP video monitor displays a full-screen image from the IP camera which is specified in the IP video monitor software as the main camera in the list of cameras connected to the IP video monitor, or from several IP cameras at the same time by dividing the IP video monitor display into several sections for viewing video stream from several IP cameras.

* * * * *